(12) United States Patent
Guender et al.

(10) Patent No.: US 12,416,319 B2
(45) Date of Patent: Sep. 16, 2025

(54) METHOD FOR CONTROLLING A HYDRAULIC SYSTEM AND HYDRAULIC CONTROL SYSTEM

(71) Applicant: Robert Bosch GmbH, Stuttgart (DE)

(72) Inventors: Andreas Guender, Ramsthal (DE);
Henning Noack, Lohr am Main (DE);
Jan Lukas Bierod, Bad Camberg (DE);
Marc Weigand, Hafenlohr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/297,813

(22) Filed: Apr. 10, 2023

(65) Prior Publication Data
US 2023/0332630 A1  Oct. 19, 2023

(30) Foreign Application Priority Data

Apr. 13, 2022  (DE) .................. 10 2022 203 716.2

(51) Int. Cl.
*F15B 21/02* (2006.01)
*F15B 13/08* (2006.01)

(52) U.S. Cl.
CPC ............ *F15B 21/02* (2013.01); *F15B 13/085* (2013.01); *F15B 13/0864* (2013.01);
(Continued)

(58) Field of Classification Search
CPC ............... F15B 13/085; F15B 13/0864; F15B 13/0867; F15B 13/0889; F15B 21/02
See application file for complete search history.

(56) References Cited

U.S. PATENT DOCUMENTS

2008/0236683 A1* 10/2008 Arbter ................ F16K 27/003
137/561 R
2008/0243422 A1* 10/2008 Nolle ................. F15B 13/0839
702/138

(Continued)

FOREIGN PATENT DOCUMENTS

DE    11 2004 002 387 T5    10/2006
DE    10 2015 222 988 A1     5/2017
(Continued)

*Primary Examiner* — Matthew Wiblin
(74) *Attorney, Agent, or Firm* — Maginot, Moore & Beck LLP

(57) ABSTRACT

A method for controlling a hydraulic system of a machine having a machine control system is disclosed. The hydraulic system includes at least one hydraulic output having an output element which can be controlled by way of activation variables and whose state can be described by state variables. The method includes registering the at least one hydraulic output, wherein registration data of the at least one hydraulic output is captured, wherein the registration data includes data concerning the activation variables and the state variables, and wherein the state variables include output state variables which describes the state of the output element of the at least one hydraulic output. The method further includes transmitting one or more data concerning the output state variables of the at least one hydraulic output to the machine control system. In addition, the method includes receiving from the machine control system a target preset for at least one of the output state variables of the at least one hydraulic output. The method also includes determining activation values for the activation variables of the at least one hydraulic output based on the target preset and activating the at least one hydraulic output with the activation values.

10 Claims, 2 Drawing Sheets

(52) U.S. Cl.
CPC ...... *F15B 13/0867* (2013.01); *F15B 13/0889* (2013.01); *F15B 2211/6336* (2013.01); *F15B 2211/6653* (2013.01)

(56) References Cited

U.S. PATENT DOCUMENTS

| | | | | |
|---|---|---|---|---|
| 2008/0257422 | A1* | 10/2008 | Fack | F15B 13/0875 91/361 |
| 2010/0211227 | A1* | 8/2010 | Arbter | G05B 19/0426 700/282 |
| 2021/0381530 | A1* | 12/2021 | Paech | F15B 13/085 |

FOREIGN PATENT DOCUMENTS

| | | |
|---|---|---|
| DE | 10 2017 206 713 A1 | 10/2018 |
| DE | 10 2017 220 539 A1 | 5/2019 |
| EP | 1 975 418 B1 | 1/2008 |

* cited by examiner

METHOD FOR CONTROLLING A HYDRAULIC SYSTEM AND HYDRAULIC CONTROL SYSTEM

This application claims priority under 35 U.S.C. § 119 to patent application no. DE 10 2022 203 716.2, filed on Apr. 13, 2022 in Germany, the disclosure of which is incorporated herein by reference in its entirety.

The present disclosure relates to a method for controlling a hydraulic system, a hydraulic control system, and a computer program for executing the latter, as well as a hydraulic output, a hydraulic pressure supply system, and a hydraulic system.

BACKGROUND

Hydraulic systems are assembled from individual components that are typically not matched to one another. Components include, for example, hydraulic pumps, power packs, various valves and control blocks, as well as hydraulic cylinders and/or hydraulic motors, or generally formulated hydraulic suppliers and hydraulic drivers. The hydraulic components can be controlled separately by a control system, e.g. a machine control system of the machine in which the hydraulic system is included, with presets for a target value, pressure, quantity, or the like, in order to realize target movement curves for the hydraulic drivers.

SUMMARY

According to the present disclosure, a method for controlling a hydraulic system, a hydraulic control system, and a computer program for executing the latter, as well as a hydraulic output, a hydraulic pressure supply system, and a hydraulic system having the features described below are proposed. Advantageous configurations are contained in the subject-matter described below.

The disclosure makes use of the following actions: capturing properties of the at least one hydraulic output, namely registration data of the at least one hydraulic output, transmitting from said registration data only data concerning output state variables (i.e. data relating to an output element) to the machine control system and, in response to a received target preset for at least one of the output state variables, determining activation values with which the at least one hydraulic output is activated. Thus, in the method, the at least one hydraulic output is automatically captured and activated, wherein the machine control system must only specify a target preset for the output element in order to move a machine component coupled to the output element. Knowledge of the exact construction of the hydraulic system, i.e. which hydraulic outputs are used, is not necessary for the machine control system. This enables the flexible use of hydraulic outputs from different manufacturers or different types without the need for reprogramming of the respective machine controllers. The different hydraulic outputs need only be suitable for the machine in the sense that they are capable of carrying out the machine-side desired movement of the output element and can otherwise be arbitrary in terms of design.

The steps of the method are in particular carried out by a computing unit, namely a hydraulic control system, which is separate from the machine control system. The machine control system does not need to know details of the at least one hydraulic output, but rather only needs to send target presets relating to the output element to the hydraulic control system in order to move machine components coupled to the output element.

A hydraulic output is a hydraulic component through which hydraulic energy or power is converted into mechanical energy or power. Accordingly, a hydraulic output comprises one or more terminals for hydraulic fluid via which hydraulic energy or power is supplied and an output element via which mechanical energy or power is dissipated. Thus, the output element is a moving element that can be coupled to machine components in order to move them. A hydraulic output or its elements can be controlled by means of activation variables, and its state can be described or characterized by state variables. State variables include output state variables that describe or characterize the state of the output element of the at least one hydraulic output.

Registration occurs approximately at the start of the hydraulic system and/or when a new hydraulic component (output, pressure supply system) is captured and/or at certain points in time. The hydraulic control system can periodically (or at any time) send corresponding requests to hydraulic components via a field bus.

Examples of state variables that characterize the state of the hydraulic output include one or more pressure values of one or more hydraulic pressures present in chambers or conduits of the hydraulic output (measured by pressure sensors); for an adjustable hydraulic motor, the pivot angle; for a hydraulic motor, the speed of the output shaft (measured with a speed sensor); for a hydraulic cylinder, the deflection and/or the speed of a rod attached to the piston (measured with a position sensor); for a hydraulic cylinder, the applied force (determined from measured pressures of the hydraulic fluid in the two cylinder chambers), or the like. The speed of the output shaft (on a hydraulic motor), the deflection (stroke) and/or the speed of a rod attached to the piston, and the applied force (on a hydraulic cylinder) are examples of output state variables. The output state variables are state variables that affect components mechanically connected to the output element, thus describing the effect of the hydraulic system on the components of the machine.

The data concerning the state variables can include data concerning which state variables are present and which ranges of values are respectively possible. For example, a hydraulic cylinder could be indicative of the maximum stroke, deflection, and/or speed. For an adjustable hydraulic motor, the maximum displacement volume or the maximum pivot angle could be indicated. Which state variables and data are present depends on the type of hydraulic output, wherein certain state variables and corresponding data are typically present for certain types (e.g. hydraulic cylinders or hydraulic motor).

Activation variables refer to all variables or signals with which the hydraulic output can be controlled. These can be control signals, such as control signals with which a current of an electro-proportional valve is controlled. If the hydraulic output itself has control, the activation variables can also be control inputs, such as control inputs for state variables, in particular output state variables, according to which the respective state variables (by controlling the hydraulic output) are brought to a particular control preset value. For this purpose, the control system of the hydraulic output can implement an adjustment. Furthermore, activation variables can also relate to settings and/or operating modes of the hydraulic output. Likewise, activation variables can be data with which a control of the hydraulic output is programmed or influenced, e.g. properties that are stored in the control of the hydraulic output.

Preferably, after the registration, the method comprises a configuring of the at least one hydraulic output, wherein configuration activation values for the activation variables of the at least one hydraulic output are determined based on the registration data, and wherein the at least one hydraulic output is activated according to the configuration activation values so as to be brought into a configuration state. A configuration is expedient because a predetermined known state of the at least one hydraulic output can thus be established.

Preferably, when registering the at least one hydraulic output, the registration data is received as registration data sent from the at least one hydraulic output. The registration data can be stored in an output communication module or control unit of the at least one hydraulic output and sent therefrom at the start of the output or in response to a corresponding request via a data link, e.g. a field bus. The registration data can also contain an identifier. Alternatively or additionally, upon registering the at least one hydraulic output, an identifier of the at least one hydraulic output sent from the at least one hydraulic output is received, and the registration data is queried from a memory of a hydraulic control system and/or a memory of a remote computing unit. The identifier should clearly identify the at least one hydraulic output, in particular its type. This configuration is advantageous when low memory is available in the output communication module or the control unit of the at least one hydraulic output. Also, faulty registration data can be easily corrected.

Preferably, the target preset comprises at least one target value and/or at least one target trajectory for the at least one of the output state variables. This is advantageous, because the machine control system only needs to specify a desired value or a desired trajectory (i.e. a sequence of temporally sequential values) to be followed by the output element. The target or target trajectory corresponds to certain positions and/or movement trajectories of the output element, to which a component of the machine to be moved is coupled so that the component is movable as desired.

Preferably, when determining the activation values, at least one first actual value is captured for the at least one of the output state variables; wherein the activation variables are determined by means of an adjustment method, such that the at least one first actual value is adjusted according to the target preset for the at least one of the output state variables. Further preferably, when determining the activation values, at least one second actual value is captured for at least one further state variable; wherein, in the adjustment method, the at least one second actual value is considered. An adjustment in the hydraulic control system is advantageous, because the state of multiple hydraulic components can be considered here. Alternatively, in the at least one hydraulic output, a control unit (e.g. implemented together with a communication module or provided as a separate control unit in the output) could be provided, which implements an adjustment.

Preferably, if the hydraulic system comprises a pressure supply system that can be controlled by supply activation variables and whose state can be described by supply state variables, the method further comprises determining of supply activation values for the supply activation variables based on the target preset and/or the activation values. In principle, it is conceivable that the hydraulic system is supplied with pressurized hydraulic fluid from the outside (via respective supply lines); however, this configuration, in which the pressure supply system is integrated into the hydraulic system and controlled in the method, is advantageous because it enables accurate and efficient control or adjustment of the pressure supply system according to the actual hydraulic pressure supply specifications required for the at least one output.

Preferably, when the hydraulic system comprises the pressure supply system, the method comprises the following actions: registering the pressure supply system, wherein supply registration data of the pressure supply system is captured, wherein the supply registration data comprises data concerning the supply activation variables and the supply state variables; configuring the pressure supply system, wherein supply configuration activation values for the supply activation variables are determined based on the supply registration data, and wherein the pressure supply system is activated according to the supply configuration activation values so as to be brought into a supply configuration state. Similar to hydraulic outputs, an automatic registration and configuration is also expedient here, without the involvement of the machine control system.

A hydraulic control system according to the disclosure for a hydraulic system is configured so as to carry out all steps of a method described below. For example, the hydraulic control system comprises at least one processor having one or more computing cores, in which a computer program is executed in order to implement the method. The computer program can be stored in a memory of the hydraulic control system. The hydraulic control system is thus in principle a computing unit, which is in particular configured so as to carry out a method according to the present disclosure, wherein a communication module is provided to exchange data with the machine control system and hydraulic components (output, pressure supply system).

A hydraulic output according to the disclosure having an output element can be controlled by means of control variables, and its state can be described (or characterized) by state variables, wherein the hydraulic output comprises an output communication module, which is configured so as to send an identifier and/or registration data concerning the activation variables and the state variables to a hydraulic control system, wherein the state variables include output state variables that describe (or characterize) the state of the output element of the at least one hydraulic output.

A hydraulic pressure supply system according to the disclosure can be controlled by means of supply activation variables, and its state can be described (or characterized) by supply state variables, wherein the hydraulic pressure supply system comprises a pressure supply communication module which is configured as to send an identifier and/or registration data concerning the supply activation variables and the supply state variables to a hydraulic control system.

A hydraulic system according to the present disclosure comprises a hydraulic control system according to the present disclosure and at least one hydraulic output according to the present disclosure and preferably a hydraulic pressure supply system according to the present disclosure.

The implementation of a method according to the disclosure in the form of a computer program or computer program product with program code for carrying out all method steps is also advantageous, because this results in particularly low costs, in particular if an executing control device is also used for further tasks and is therefore present in any event. Suitable data carriers for providing the computer program are, in particular, magnetic, optical, and electric storage media, such as hard disks, flash memory, EEPROMs, DVDs, and others. A download of a program via computer networks (Internet, Intranet, etc.) is also possible.

Additional advantages and configurations of the disclosure result from the description and the enclosed drawing.

It is understood that the aforementioned features and the features yet to be explained below can be used not only in the respectively specified combination but also in other combinations or alone, without leaving the scope of the present disclosure.

The disclosure is thoroughly illustrated schematically in the drawing on the basis of embodiment examples and is described below with reference to the drawing.

DETAILED DESCRIPTION

Figure 1:
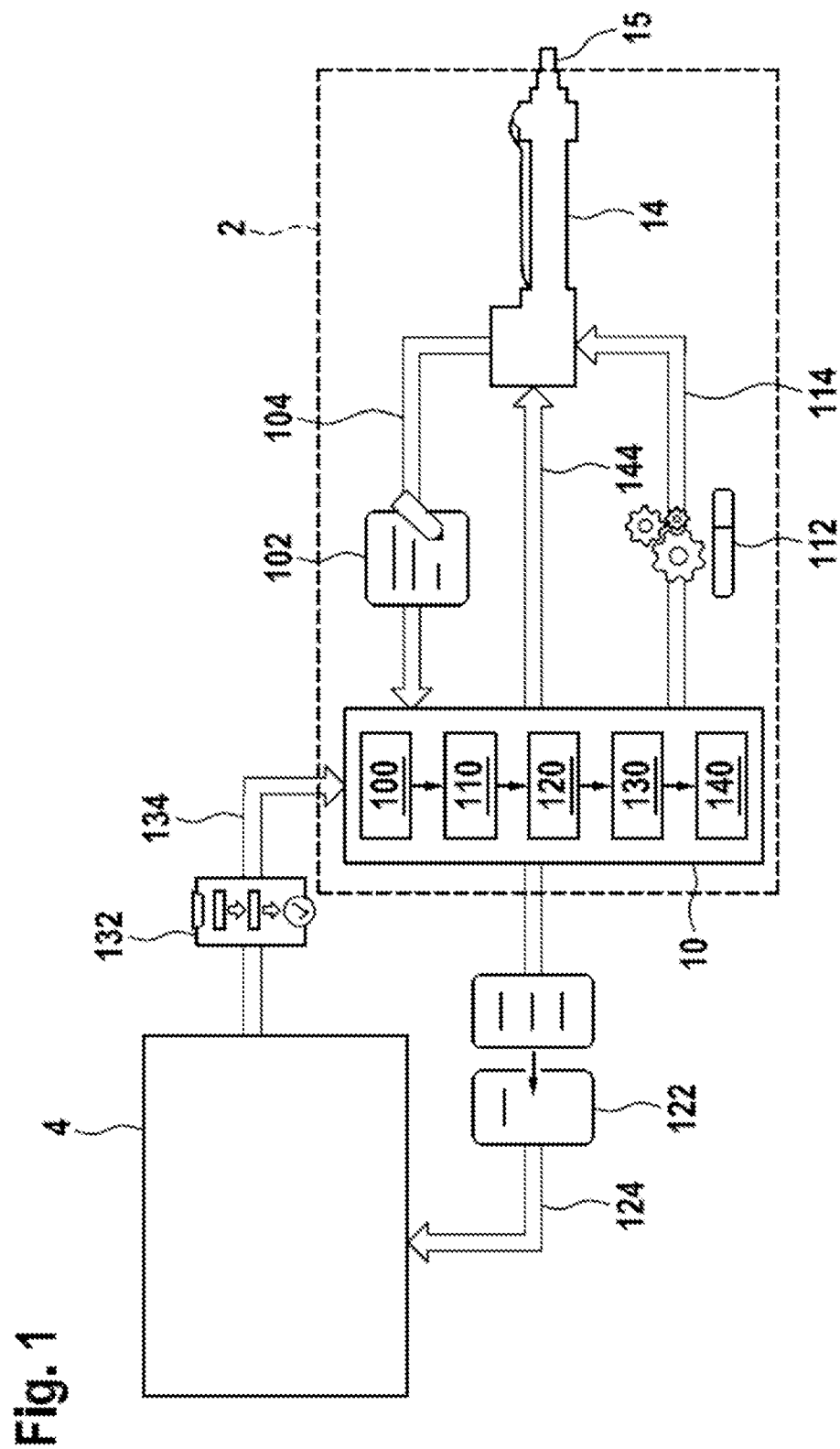
FIG. 1 illustrates the principle workflow of the method for controlling a hydraulic system.

FIG. 1 illustrates the principle workflow of the method for controlling a hydraulic system. The method is shown in the context of a hydraulic system 2, which has a hydraulic output 14 and a hydraulic control system 10, and a machine control system 4. The hydraulic output 14 (for example, a hydraulic cylinder) comprises an output element 15 (for example, a rod connected to the piston of the hydraulic cylinder) that can be coupled to a machine component (not shown) to be moved by the hydraulic system. The hydraulic control system, the hydraulic output, and the machine control system are connected to one another (not shown) for data communication via a data link, such as a field bus. The method is in particular carried out by the hydraulic control system, which is configured accordingly. By way of example, only one hydraulic output is shown, but of course the method can also be applied to hydraulic systems having multiple hydraulic outputs.

In step 100, the at least one hydraulic output 14 is registered. In doing so, registration data 102 is captured that includes data concerning the activation variables and the state variables, wherein the state variables include output state variables describing the state of the output element. The registration data 102 can be sent to the hydraulic control system, for example from the hydraulic output (arrow 104); this can occur in response to a corresponding request from the hydraulic control system 10 or at specified times, such as upon the start of the hydraulic system or hydraulic output.

In the preferred step 110, the hydraulic output is configured. Here, configuration activation values 112 for the activation variables of the at least one hydraulic output 14 are determined based on the registration data, and the hydraulic output is activated according to the determined configuration activation values (arrow 104). As a result, the hydraulic output can be brought to a known configuration state.

In step 120, there is a transmission of one or more (reference numbers 122) data concerning the output state variables of the hydraulic output to the machine control system 4, e.g. the one or more data concerning the output state variables is sent to the machine control system (arrow 124). In this way, the machine control system can be notified for which output state variables, i.e. state variables of the output element, the machine control system can send and/or transmit targets presets to the hydraulic control system.

In step 130, a target preset 132 is received for at least one of the output state variables. The target preset 132 is sent from the machine control system 10 to the hydraulic control system (arrow 134).

In step 140, a determination of activation values for the activation variables of the hydraulic output is made based on the received target preset 132. This determination can in particular be made by capturing current state values, i.e. actual values for the state variables of the hydraulic output and, based thereon, can comprise a determination of the activation values by means of an adjustment. The actual values can in particular be captured by sensors or sensor modules in the hydraulic output and sent from an output communication module to the hydraulic control system (not shown in detail). Furthermore, the at least one hydraulic output 12 is activated with the determined activation values (arrow 144).

Figure 2:
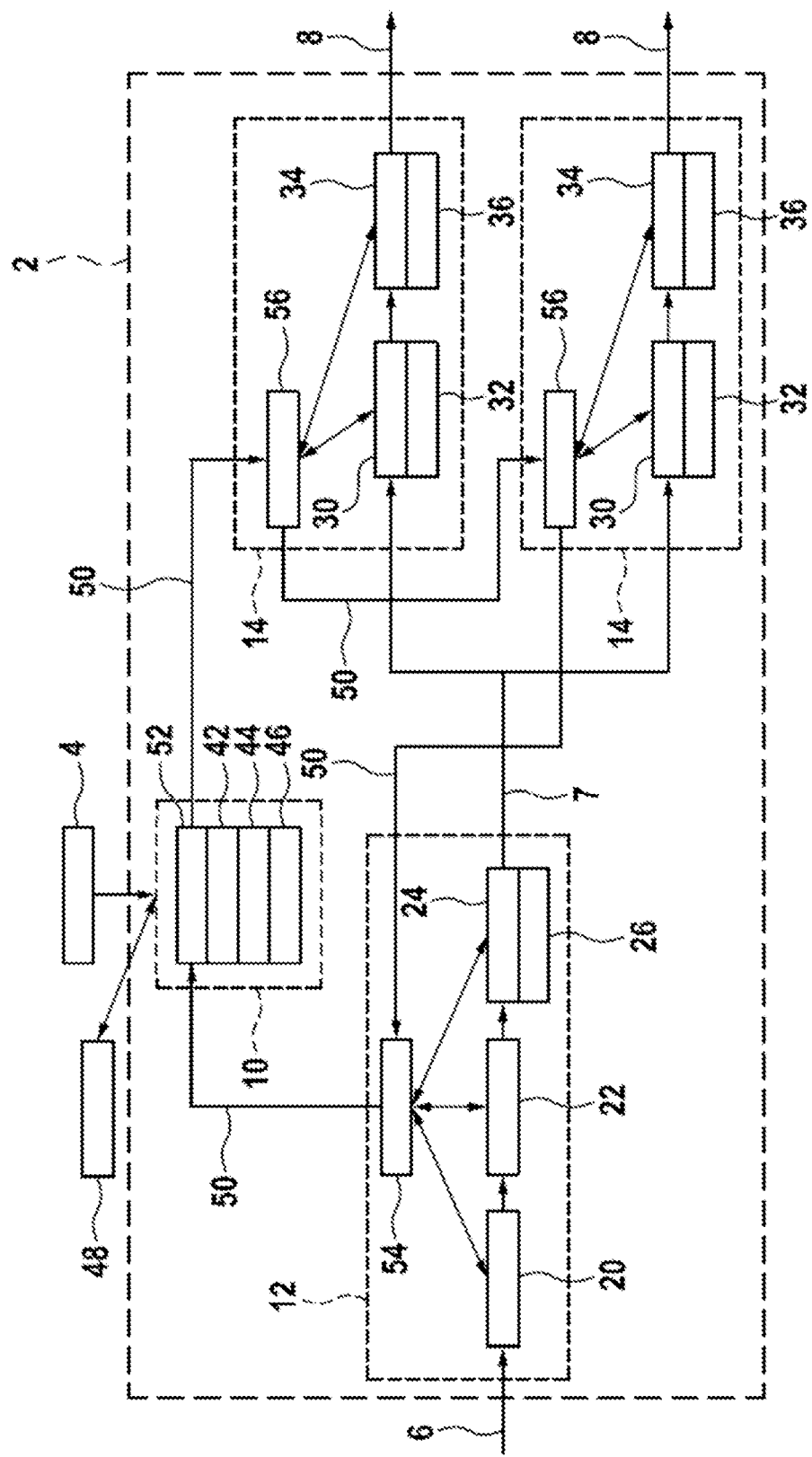
FIG. 2 shows an exemplary hydraulic system according to a preferred embodiment.

FIG. 2 shows an exemplary hydraulic system 2 according to a preferred embodiment. For example, the hydraulic system 2 can be provided in a machine controlled by a machine control system 4. By means of the hydraulic system 2 shown, electrical energy or electrical power 6 is converted into mechanical energy or mechanical power 8, by which components or actuators of the machine are moved.

The hydraulic system 2 shown comprises multiple hydraulic components, namely a hydraulic control system 10, for example two hydraulic outputs 14, and preferably a (hydraulic) pressure supply system 12. Of course, a different number of hydraulic components can also be provided, and/or hydraulic components of a different type or construction can be provided. The hydraulic outputs can be considered hydraulic consumers.

The machine control system 4, the pressure supply system 12, and the two hydraulic outputs 14 are connected to one another via a data link 50 to the data communication. This can be a wired or wireless data link. For example, it can be a field bus according to standard IEC 61158 or IEC 61784 (IEC: International Electrotechnical Commission). For example, in FIG. 2, a field bus with ring topology is shown.

Each of the components comprises a communication module connected to the data link 50. A hydraulic control communication module 52 is provided in the hydraulic control system, a pressure supply communication module 54 is provided in the pressure supply system, and output communication modules 56 are provided in the hydraulic outputs 14. The pressure supply communication module 54 and/or the output communication modules 56 can optionally be configured so as to control components of the pressure supply system 12 and the output 14, respectively.

Each of the hydraulic components has certain properties and a state and can be controlled by means of activation variables, i.e. by means of presetting of activation values for the activation variables. The state can be described by state variables, i.e. the state is characterized by state values of the state variables. The state variables comprise in particular measured values of sensor modules.

In addition to the pressure supply communication module 52, the pressure supply system 12 comprises a frequency inverter 20, an electric motor 22, a hydraulic pump 24, and a pump sensor module 26. Electrical power 6, e.g. provided as a multi-phase AC current, is converted by the frequency inverter 20 in order to drive the electric motor 22, which is connected to a drive shaft of the hydraulic pump 24. With a hydraulic pump 24, hydraulic fluid is pumped into hydraulic lines connected to hydraulic outputs 14 (not shown in detail), or the outputs are supplied with pressurized hydraulic fluid, i.e. the outputs 14 are supplied with hydraulic energy or hydraulic power 7. The pressure supply system 12 (and its elements) is optional because pressurized hydraulic fluid could also be provided to the hydraulic system from the outside, for example from a hydraulic supply that supplies pressurized hydraulic fluid to multiple machines. One or more of the elements of the pressure supply 12 (frequency converter, electromotor, hydraulic pump, pump sensor module) can be controlled by means of supply activation variables received by the pressure supply communication module 52.

The pump sensor module 26 comprises one or more sensors and captures, for example, one or more of an input-side (input side of the hydraulic pump) pressure of the hydraulic fluid, an output-side pressure of the hydraulic fluid, a speed of the activation shaft of the hydraulic pump, or the like. The captured readings can be communicated to the hydraulic control system 10 or hydraulic control communication module 52 via the pressure supply communication module 52. These measured values are examples of supply state variables.

In addition to the output communication module 56, each output 14 has a valve unit 30, a valve sensor module 32, an output actuator 34 (or output actuator), and an output sensor module 36. The output actuator 34 can be, for example, a hydraulic cylinder or hydraulic motor, independently of one another, for various outputs 14. Hydraulic fluid is supplied to the output actuator 34 via the valve unit 30, wherein the valve unit 30 controls the flow rate of hydraulic fluid to the output actuator 34 by means of at least one valve provided therein, wherein the output has an output element which is moved via the valve unit corresponding to the activation and is connected to a component of the machine to be moved (outside of the hydraulic system). Thus, mechanical power 8 is delivered via the output element to components of the machine to be moved outside of the hydraulic system. For example, in the case of a hydraulic cylinder, the output element can be a rod connected to the piston, wherein the valve unit controls the flow rates into the two chambers of the hydraulic cylinder. For example, in the case of a hydraulic motor, the output element is an output shaft. One or more of the elements of the outputs 14 (valve unit, valve sensor module, output actuator, output sensor module) can be controlled by way of activation variables received by the respective output communication module 56.

The valve sensor module 32 comprises one or more sensors and captures, for example, one or more pressures of the hydraulic fluid, or the like. For example, the output sensor module 36 comprises one or more sensors and captures one or more of one or more pressures of the hydraulic fluid, such as in hydraulic cylinder chambers, a state of the output, such as position and/or speed and/or engine speed of the output element, or the like. The variables captured by the valve sensor module 32 and the output sensor module 36 can be considered state variables of the particular output. The measured values captured by the valve sensor module 32 and the output sensor module 36 can be sent to the hydraulic control system 10 and the hydraulic control communication module 52, respectively, via the respective output communication module 52.

In addition to the data captured by the sensor modules (pump sensor module, valve sensor modules, output sensor modules), the pressure supply communication module 54 and/or the output communication modules can also store further data used in the registration and transmit it to the hydraulic control system 10 or its hydraulic control communication module 52. This is in particular data that describes properties of the respective hydraulic component.

The hydraulic control system 10 comprises one or more processors in which computer programs are executed, e.g. stored in a memory of the hydraulic control system for implementing control functions, wherein the hydraulic control system is configured so as to implement a method according to the present disclosure. In particular, an initialization program 42 with which steps 100 to 130 of FIG. 1 are implemented for each output 14, a utility control program whose execution adjusts the pressure supply system 12, and at least one output control program 46 whose execution adjusts one or more outputs 14 can be provided.

In order to realize these functionalities, the hydraulic control system 10 can receive data from the hydraulic components (pressure supply system 12, outputs 14) via the hydraulic control communication module 52, in particular data sent from hydraulic components during registration thereof and measured values captured by the sensor modules (pump sensor module, valve sensor modules, output sensor modules). Likewise, the hydraulic control system 10 can send data to the hydraulic components via the hydraulic control communication module 52, in particular the configuration data and/or control instructions (i.e. activation values for the activation variables) that serve to control the hydraulic components. The configuration data and/or control instructions are received from the communication modules (pressure supply communication module 54, output communication modules 56) and used directly by them for the activation of the individual elements of the hydraulic components (frequency inverter, electric motor, and hydraulic pump or valve module) (if the communication modules implement control and/or control functions) and/or relayed to the individual elements (if control units are provided thereon).

It can be provided that the hydraulic control system 10 can be configured for data communication with a remote computing unit 48 (e.g. server or cloud service). Via this data communication connection, data that is generated during registration or configuration of hydraulic components can be transmitted to the remote computing unit (such as for storage and/or analysis) and, if necessary, retrieved from the remote computing unit (for example, in order to expedite the process of registration and configuration upon renewed implementation).

What is claimed is:
1. A method for controlling a hydraulic system of a machine having a machine control system, wherein the hydraulic system includes at least one hydraulic output having an output element configured to be controlled by way of activation variables and whose state can be described by state variables, the method comprising:
registering the at least one hydraulic output, wherein registration data of the at least one hydraulic output is captured, wherein the registration data includes data concerning the activation variables and the state variables, and wherein the state variables include output state variables which describes the state of the output element of the at least one hydraulic output;
transmitting one or more data concerning the output state variables of the at least one hydraulic output to the machine control system;
receiving from the machine control system a target preset for at least one of the output state variables of the at least one hydraulic output; and
determining activation values for the activation variables of the at least one hydraulic output based on the target preset and activating the at least one hydraulic output with the activation values,
wherein when determining the activation values, at least one first actual value is captured for the at least one of the output state variables, and wherein the activation variables are determined by way of an adjustment method, such that the at least one first actual value is adjusted according to the target preset for the at least one of the output state variables.

2. The method according to claim 1, further comprising:
after the registration, configuring the at least one hydraulic output,
wherein configuration activation values for the activation variables of the at least one hydraulic output are determined based on the registration data, and
wherein the at least one hydraulic output is activated according to the configuration activation values so as to be brought into a configuration state.

3. The method according to claim 1, wherein upon registration of the at least one hydraulic output:
the registration data is received as registration data sent from the at least one hydraulic output; and/or
an identifier of the at least one hydraulic output sent from the at least one hydraulic output is received, and the registration data is queried from a memory of a hydraulic control system and/or a memory of a remote computing unit.

4. The method according to claim 1, wherein the target preset comprises at least one target value and/or at least one target trajectory for the at least one of the output state variables.

5. The method according to claim 1, wherein:
when determining the activation values, at least one second actual value is captured for at least one further state variable, and
in the adjustment method, the at least one second actual value is considered.

6. A hydraulic control system for a hydraulic system configured so as to carry out all steps of the method according to claim 1.

7. The method according to claim 1, wherein a computer program comprises instructions that, when the computer program is executed by a computer, prompt the computer to carry out the method.

8. A computer-readable disk on which the computer program according to claim 7 is stored.

9. A method for controlling a hydraulic system of a machine having a machine control system, wherein the hydraulic system includes at least one hydraulic output having an output element configured to be controlled by way of activation variables and whose state can be described by state variables, the method comprising:
registering the at least one hydraulic output, wherein registration data of the at least one hydraulic output is captured, wherein the registration data includes data concerning the activation variables and the state variables, and wherein the state variables include output state variables which describes the state of the output element of the at least one hydraulic output;
transmitting one or more data concerning the output state variables of the at least one hydraulic output to the machine control system;
receiving from the machine control system a target preset for at least one of the output state variables of the at least one hydraulic output; and
determining activation values for the activation variables of the at least one hydraulic output based on the target preset and activating the at least one hydraulic output with the activation values,
wherein the hydraulic system comprises a pressure supply system which is configured to be controlled by way of supply activation variables and whose state can be described by supply state variables, and
wherein the method further comprises determining supply activation values for the supply activation variables based on the target preset and/or the activation values.

10. The method according to claim 9, further comprising:
registering the pressure supply system, wherein supply registration data of the pressure supply system is captured, and wherein the supply registration data comprises data concerning the supply activation variables and the supply state variables; and
configuring the pressure supply system, wherein supply configuration activation values for the supply activation variables are determined based on the supply registration data, and wherein the pressure supply system is activated according to the supply configuration activation values so as to be brought into a supply configuration state.

* * * * *